(12) United States Patent
Jeyasingh et al.

(10) Patent No.: US 7,177,967 B2
(45) Date of Patent: Feb. 13, 2007

(54) CHIPSET SUPPORT FOR MANAGING HARDWARE INTERRUPTS IN A VIRTUAL MACHINE SYSTEM

(75) Inventors: Stalinselvaraj Jeyasingh, Beaverton, OR (US); Andrew V. Anderson, Hillsboro, OR (US); Steven M. Bennett, Hillsboro, OR (US); Erik Cota-Robles, Portland, OR (US); Alain Kagi, Portland, OR (US); Gilbert Neiger, Portland, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 10/676,890

(22) Filed: Sep. 30, 2003

(65) Prior Publication Data

US 2005/0080970 A1    Apr. 14, 2005

(51) Int. Cl.
*G06F 13/24* (2006.01)
*G06F 13/26* (2006.01)
*G06F 9/445* (2006.01)
*G06F 12/00* (2006.01)

(52) U.S. Cl. ........................ 710/260; 710/266; 710/48; 712/224

(58) Field of Classification Search ........ 710/260–269, 710/200, 40, 48, 49; 712/224, 244; 718/1, 718/100, 103, 108; 711/6, 151, 203; 700/1
See application file for complete search history.

(56) References Cited

U.S. PATENT DOCUMENTS 3,699,532 A     10/1972   Schaffer et al.
3,996,449 A     12/1976   Attanasio et al.
4,037,214 A      7/1977   Birney et al.
4,162,536 A      7/1979   Morley
4,207,609 A      6/1980   Luiz et al.
4,247,905 A      1/1981   Yoshida et al.
4,276,594 A      6/1981   Morley
4,278,837 A      7/1981   Best
4,307,447 A     12/1981   Provanzano et al.

(Continued)

FOREIGN PATENT DOCUMENTS

DE       4217444      12/1992

(Continued)

OTHER PUBLICATIONS

"Test floor verification of multiprocessor hardware" by Saha et al. (abstract only) Publication Date: Mar. 27-29, 1996.*

(Continued)

*Primary Examiner*—Gopal C. Ray
(74) *Attorney, Agent, or Firm*—Blakely, Sokoloff, Taylor & Zafman LLP (57) ABSTRACT

In one embodiment, an apparatus includes a set of multiplex blocks coupled with an interrupt controller and multiple interrupt request lines, and a virtual machine monitor block (VMM) coupled to the set of multiplex blocks. Each multiplex block corresponds to a distinct interrupt request line. Each multiplex block is to route the interrupt request signal received via the corresponding interrupt request line either to the interrupt controller or the VMM block depending on a current configuration value of this multiplex block.

18 Claims, 5 Drawing Sheets

U.S. PATENT DOCUMENTS

| | | |
|---|---|---|
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,459,661 A * | 7/1984 | Kaneda et al. ............ 718/100 |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,812,967 A * | 3/1989 | Hirosawa et al. .......... 710/269 |
| 4,825,052 A | 4/1989 | Chemin et al. |
| 4,837,674 A | 6/1989 | Taken |
| 4,860,190 A | 8/1989 | Kaneda et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,088,031 A * | 2/1992 | Takasaki et al. ............ 718/100 |
| 5,117,350 A * | 5/1992 | Parrish et al. ................ 711/1 |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,291,605 A | 3/1994 | Takagi et al. |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,392,406 A | 2/1995 | Petersen et al. |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,452,462 A * | 9/1995 | Matsuura et al. ............... 718/1 |
| 5,455,909 A | 10/1995 | Blomgren et al. |
| 5,459,867 A | 10/1995 | Adams et al. |
| 5,459,869 A | 10/1995 | Spilo |
| 5,459,872 A * | 10/1995 | Connell et al. ............ 710/263 |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,018 A | 7/1996 | DeJager et al. |
| 5,533,126 A | 7/1996 | Hazard |
| 5,535,420 A | 7/1996 | Kardach et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,940,610 A | 8/1999 | Baker et al. |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |

| | | |
|---|---|---|
| 6,222,923 B1 | 4/2001 | Schwenk |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne et al. |
| 6,272,637 B1 | 8/2001 | Little et al. |
| 6,275,933 B1 | 8/2001 | Fine et al. |
| 6,281,658 B1 * | 8/2001 | Han et al. ............ 318/729 |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,452,937 B1 * | 9/2002 | Borkovic et al. ............ 370/442 |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,167 B2 * | 1/2003 | Han et al. ............ 318/729 |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,803,787 B1 * | 10/2004 | Wicker, Jr. ............ 326/46 |
| 6,826,749 B2 * | 11/2004 | Patel et al. ............ 717/148 |
| 6,870,899 B2 * | 3/2005 | Lu et al. ............ 379/1.04 |
| 6,961,806 B1 * | 11/2005 | Agesen et al. ............ 711/6 |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |
| 2005/0210467 A1 * | 9/2005 | Zimmer et al. ............ 718/1 |
| 2006/0036791 A1 * | 2/2006 | Jeyasingh et al. ............ 710/260 |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| JP | 2000076139 | 3/2000 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9918511 | 4/1999 |
| WO | WO9957863 | 11/1999 |
| WO | WO9965579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO9909482 | 1/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

Berg, Cliff, "How Do I Create a Signed Applet?", *Dr. Dobb's Journal*, (Aug. 1997),1-9.

Brands, Stefan, "Restrictive Blinding of Secret-Key Certificates", *Springer-Verlag XP002201306*, (1995), Chapter 3.

Chien, Andrew A., et al., "Safe and Protected Execution for the Morph/AMRM Reconfigurable Processor", *7th Annual IEEE Symposium, FCCM '99 Proceedings, XP010359180, ISBN 0-7695-0375-6, Los Alamitos, CA*, (Apr. 21, 1999), 209-221.

Compaq Computer Corporation, "Trusted Computing Platform Alliance (TCPA) Main Specification Version 1.1a", *XP002272822*, (Jan. 25, 2001), 1-321.

Coulouris, George, et al., "Distributed Systems, Concepts and Designs", *2nd Edition*, (1994), 422-424.

Crawford, John, "Architecture of the Intel 80386", *Proceedings of the IEEE International Conference on Computer Design: VLSI in Computers and Processors (ICCD '86)*, (Oct. 6, 1986), 155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S., "Capability-Based Addressing", *Fabry, R.S., "Capability-Based Addressing," Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Goldberg, Robert P., "Survey of Virtual Machine Research", *COMPUTER Magazine*, (Jun. 1974),3 4-35.

Gong, Li, et al., "Going Beyond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983), 530-544.

Heinrich, Joe, "MIPS R4000 Microprocessor User's Manual, Second Edition", *Chapter 4 Memory Management*, (Jun. 11, 1993), 61-97.

HP Mobile Security Overview, "HP Mobile Security Overview", (Sep. 2002), 1-10.

IBM, "Information Display Technique for a Terminate Stay Resident Program IBM Technical Disclosure Bulletin", *TDB-ACC-No. NA9112156, vol. 34, Issue 7A*, (Dec. 1, 1991), 156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002), 1-6.

Intel, "IA-32 Intel Architecture Software Developer's Manual", *vol. 3: System Programming Guide*, Intel Corporation—2003,13-1 through 13-24.

Intel, "Intel386 DX Microprocessor 32-Bit CHMOS Microprocessor With Integrated Memory Management", (1995), 5-56.

Intel Corporation, "IA-64 System Abstraction Layer Specification", *Intel Product Specification, Order No. 245359-001*, (Jan. 2000), 1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", *vol. 2: IA-64 System Architecture, Order No. 245318-001*, (Jan. 2000),i, ii, 5.1-5.3, 11.1-11.8, 11.23-11.26.

Karger, Paul A., et al., "A VMM Security Kernal for the VAX Architecture", *Proceedings of the Symposium on Research in Security and Privacy, XP010020182, ISBN 0-8186-2060-9, Boxborough, MA*, (May 7, 1990),2-19.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin, et al., "Running Multiple Operating Systems Concurrently on an IA32 PC Using Virtualization Techniques", http://www.plex86.org/research/paper.txt, (Nov. 29, 1999), 1-31.

Luke, Jahn, et al., "Replacement Strategy for Aging Avionics Computers", *IEEE AES Systems Magazine*XP002190614,(Mar. 1999).

Menezes, Alfred J., et al., "Handbook of Applied Cryptography", *CRC Press LLC, USA XP002201307*, (1997), 475.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Motorola, "M68040 User's Manual", (1993), 1-1 to 8-32.

Nanba, S., et al., "VM/4: ACOS-4 Virtual Machine Architecture", *VM/4: ACOS-4 Virtual Machine Architecture, IEEE*, (1985), 171-178.

Richt, Stefan, et al., "In-Circuit-Emulator Wird Echtzeittauglich", *Elektronic, Franzis Verlag GMBH, Munchen, DE*, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium, XP002247347, Denver, Colorado*, (Aug. 14, 2000), 1-17.

Rosenblum, M., "Virtual Platform: A Virtual Machine Monitor for Commodity PC", *Proceedings of the 11th Hotchips Conference*, (Aug. 17, 1999), 185-196.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.rsasecurity.com/node.asp?id=1313, 1-2.

Saez, Sergio, et al., "A Hardware Scheduler for Complex Real-Time Systems", *Proceedings of the IEEE International Symposium on Industrial Electronics*, XP002190615,(Jul. 1999), 43-48.

Schneier, Bruce, "Applied Cryptography: Protocols, Algorithm, and Source Code in C", *Wiley, John & Sons, Inc.*, XP002939871; ISBN 0471117099, (Oct. 1995),47-52.

Schneier, Bruce, "Applied Cryptography: Protocols, Algorithm, and Source Code in C", *Wiley, John & Sons, Inc.*, XP002138607; ISBN 0471117099, (Oct. 1995),56-65.

Schneier, Bruce, "Applied Cryptography: Protocols, Algorithms, and Source Code C", *Wiley, John & Sons, Inc.*, XP0021111449; ISBN 0471117099, (Oct. 1995),169-187.

Schneier, Bruce, "Applied Cryptography: Protocols, Algorithms, and Source Code in C", *2nd Edition: Wiley, John & Sons, Inc.*, XP002251738; ISBN 0471128457,(Nov. 1995),28-33; 176-177; 216-217; 461-473; 518-522.

Sherwood, Timothy, et al., "Patchable Instruction ROM Architecture", *Department of Computer Science and Engineering, University of California, San Diego, La Jolla, CA*, (Nov. 2001).

"Virtual machine monitors: current technology and future trends" by Rosenblum et al. (abstract only) Publication Date: May 2005.*

"An analysis of disk performance in VMware ESX server virtual machine" by Ahmad et al. (abstract only) Publication Date: Oct. 27, 2003.*

Hall, Judith S., et al., "Virtualizing the VAX Architecture," ACM Sigarch Computer Architecture News, Proceedings of the 18th annual international symposium on Computer architecture, vol. 19, Issue No. 3, Apr. 1991, 10 pages.

Iraschko, R.R., et al., "A highly efficient path-resolution protocol for management of optical network transport integrity," (abstract only), IEEE Explore vol. 19, Issue 5, Publication Date: May 2000, 5 pages.

\* cited by examiner

CHIPSET SUPPORT FOR MANAGING HARDWARE INTERRUPTS IN A VIRTUAL MACHINE SYSTEM

FIELD

Embodiments of the invention relate generally to virtual machines, and more specifically to managing hardware interrupts in a virtual machine system.

BACKGROUND OF THE INVENTION

In a typical computer system, devices request services from system software by generating interrupt requests, which are propagated to an interrupt controller via multiple interrupt request lines. Once the interrupt controller identifies an active interrupt request line, it sends an interrupt signal to the processor. In response, the interrupt controller interface logic on the processor determines whether the software is ready to receive the interrupt. If the software is not ready to receive the interrupt, the interrupt is held in a pending state until the software becomes ready. Once the software is determined to be ready, the interrupt controller interface logic requests the interrupt controller to report which of the pending interrupts is highest priority. The interrupt controller prioritizes among the various interrupt request lines and identifies the highest priority interrupt request to the processor which then transfers control flow to the code that handles that interrupt request.

In a conventional operating system (OS), all the interrupts are controlled by a single entity known as an OS kernel. In a virtual machine system, a virtual-machine monitor (VMM) should have ultimate control over various operations and events occurring in the system to provide proper operation of virtual machines and for protection from and between virtual machines. To achieve this, the VMM typically receives control when guest software accesses certain hardware resources or certain events occurs, such as an interrupt or an exception. In particular, when system devices generate interrupts, the VMM may intercede between the virtual machine and the interrupt controlling device. That is, when an interrupt signal is raised, the currently running virtual machine is interrupted and control of the processor is passed to the VMM. The VMM then receives the interrupt and handles the interrupt or delivers the interrupt to an appropriate virtual machine.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

A method and apparatus for controlling interrupts in a virtual machine system are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computing system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe embodiments of the present invention in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom and hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence or various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Figure 1:
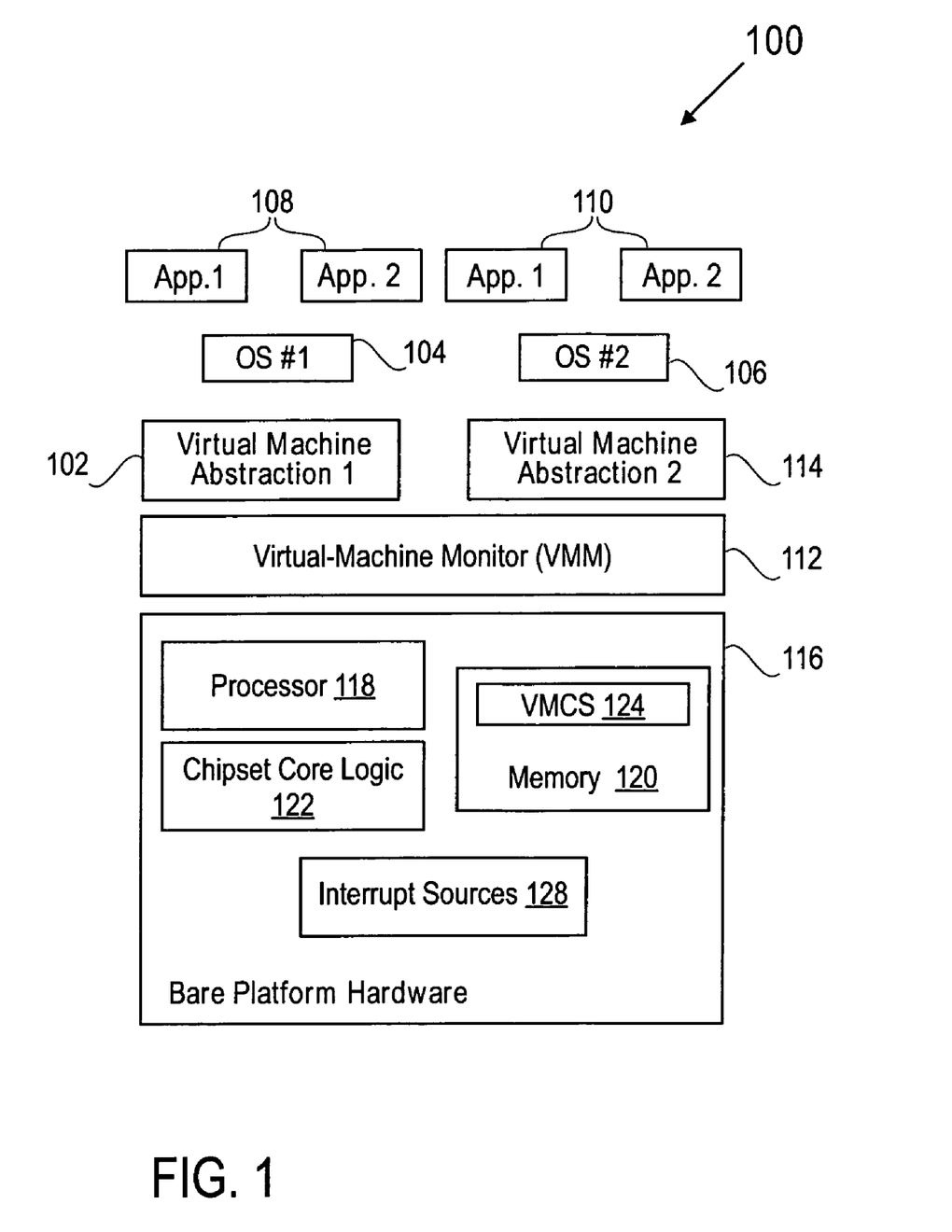
FIG. 1 illustrates one embodiment of a virtual-machine environment, in which the present invention may operate.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112.

The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs may be implemented, for example, in hardware, software, firmware or by a combination of various techniques.

The platform hardware 116 can be of a personal computer (PC), mainframe, handheld device, portable computer set-top box, or any other computing system. The platform hardware 116 includes a processor 118, memory 120, chipset core logic 122 and one or more interrupt sources 128.

Processor 118 can be any type of processor capable of executing software, such as a microprocessor, digital signal processor, microcontroller, or the like. The processor 118 may include microcode, programmable logic or hardcoded logic for performing the execution of method embodiments of the present invention. Though FIG. 1 shows only one such processor 118, there may be one or more processors in the system.

Memory 120 can be a hard disk, a floppy disk, random access memory (RAM), read only memory (ROM), flash memory, any combination of the above devices, or any other type of machine medium readable by processor 118. Memory 120 may store instructions and/or data for performing the execution of method embodiments of the present invention.

The one or more interrupt sources 128 may be, for example, input-output (I/O) devices (e.g., network interface cards, communications ports, video controllers, disk controllers) or system buses (e.g., PCI, ISA, AGP) or devices integrated into the chipset logic or processor (e.g., real-time clocks, the programmable timers, performance counters).

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108 and 110. Each of the guests OSs 104 and 106 expect to access physical resources (e.g., processor registers, memory and I/O devices) within the VMs 102 and 114 on which the guest OS 104 or 106 is running and to handle various events including interrupts generated by system devices during the operation of the VMs 102 and 114.

Some interrupts may need to be handled by a currently operating VM. Other interrupts may need to be handled by the VMM 112 or a VM that is not currently operating. If the interrupt is to be handled by the currently-operating VM, control remains with this VM, and the interrupt is delivered to this VM if it is ready to receive interrupts (as indicated, for example, by an interrupt flag in a designated processor register). If the interrupts is to be handled by the VMM 112, control is transferred to the VMM 112. The transfer of control from guest software to the VMM 112 is referred to herein as a VM exit. After receiving control following the VM exit, the VMM 112 may perform a variety of processing, including, for example, acknowledging and handling the interrupt, after which it may return control to guest software. If the VMM does not handle the interrupt itself, it may facilitate delivery of the interrupt to a VM designated to handle the interrupt. The transfer of control from the VMM to guest software is referred to as a VM entry.

In one embodiment, the processor 118 controls the operation of the VMS 102 and 114 in accordance with data stored in a virtual machine control structure (VMCS) 124. The VMCS 124 is a structure that may contain state of guest software, state of the VMM 112, execution control information indicating how the VMM 112 wishes to limit or otherwise control operation of guest software, information controlling transitions between the VMM 112 and a VM, etc. In one embodiment, the VMCS 124 is stored in memory 120. In another embodiment, the VMCS 124 is stored in the processor 118. In some embodiments, multiple VMCS structures are used to support multiple VMs.

The processor 118 reads information from the VMCS 124 to determine the execution environment of the VM and to constrain its behavior. For example, the processor 118 may consult the execution control information in the VMCS to determine if external interrupts are to cause VM exits. When a VM exit occurs, components of the processor state used by guest software are saved to the VMCS 124, and components of the processor state required by the VMM 112 are loaded from the VMCS 124. When a VM entry occurs, the processor state that was saved at the VM exit is restored using data stored in the VMCS 124, and control is returned to guest software.

In one embodiment, chipset core logic 122 is coupled to the processor 118 to assist the processor 118 in handling interrupts generated by the interrupt sources 128, described below. The chipset logic 122 may be part of the processor 118 or an independent component. The chipset logic 122 may include microcode, programmable logic or hardcoded logic for performing the execution of method embodiments of the present invention. Though FIG. 1 shows only one chipset logic 122, the system may contain one or more such chipsets.

As will be discussed in more detail below, the chipset core logic 122 controls the distribution of interrupts generated by the one or more interrupt sources 128. IF an interrupt is generated by a device that is managed by a currently operating VM, the chipset core logic 122 sends the interrupt request to the processor 118 for delivery to the currently operating VM. If an interrupt is generated by a device that is not managed by a currently operating VM, the chipset core logic 122 either holds the interrupt pending or indicates to the processor 118 that control is to be transitioned to the VMM 112.

Figure 2:
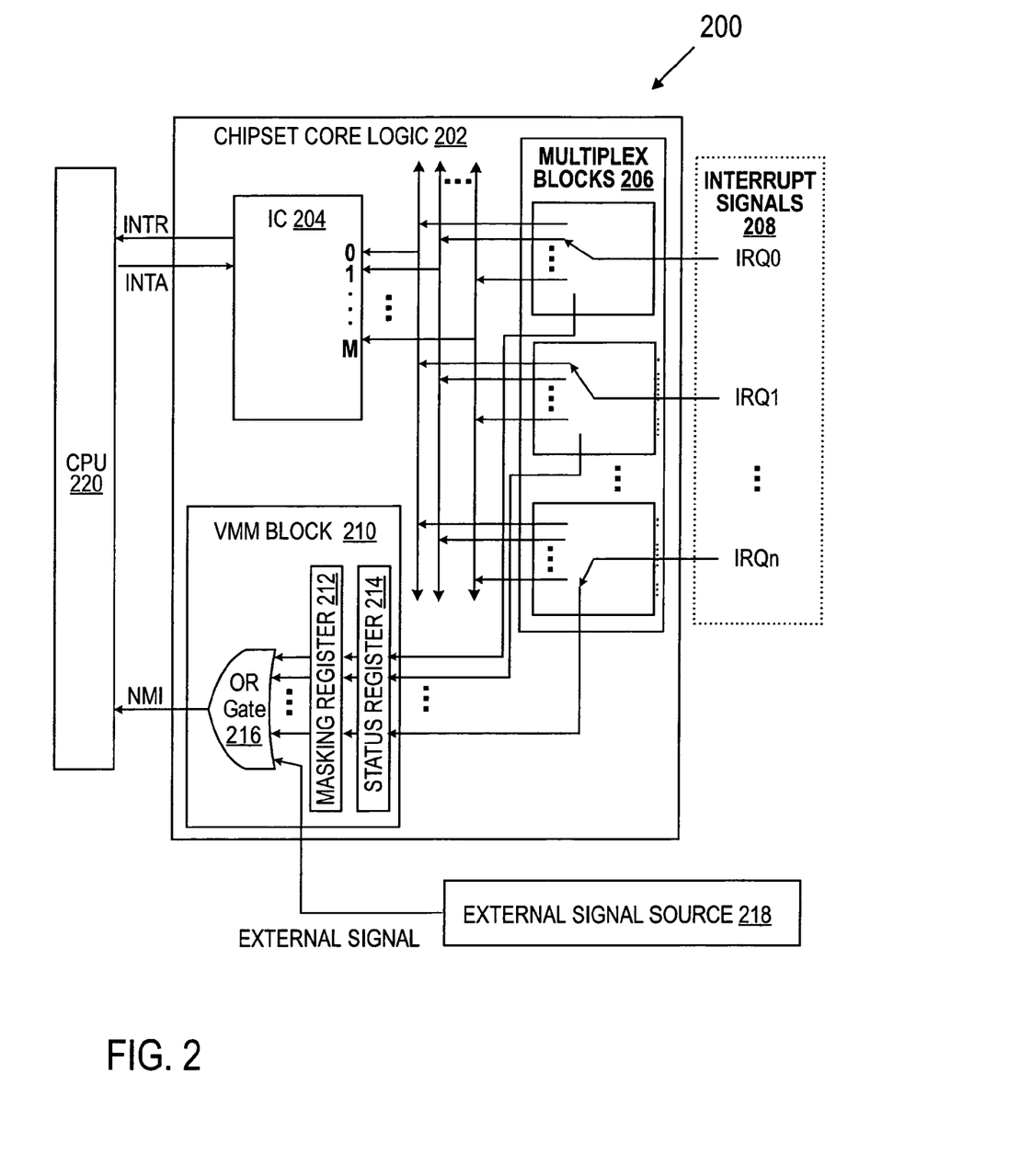
FIG. 2 is a block diagram of one embodiment of a system for processing interrupts in a virtual machine environment.

FIG. 2 is a block diagram of one embodiment of a system 200 for processing interrupts in a virtual machine environment. The system 200 includes a processor 220 and chipset core logic 202. The system 200 is active during operation of the VMM and during operation of guest software. The term "currently operating software" is used herein to refer to the VMM or the currently operating guest software (i.e., the currently operating VM).

In one embodiment, the chipset core logic 202 includes an interrupt controller 204, a set of multiplex blocks 206, and a VMM block 210.

The interrupt controller 204 receives interrupt request signals generated by system devices and delivers interrupt requests (INTRs) to the processor 220. In an embodiment, the processor acknowledges an interrupt request from the interrupt controller 204 by an interrupt acknowledgement bus cycle (INTA), for which the interrupt controller 204 returns the vector number of the interrupt service routine to be executed to service the interrupt.

The interrupt controller 204 has a state machine and a number of registers, which may include readable and writable registers, read-only registers and write-only registers. In one embodiment, the interrupt controller 204 includes a read and write access path to its registers to allow a VMM to save the current state of the interrupt controller 204 (e.g., in the VMCS or in a VMM data structure) and to restore the interrupt controller state associated with a VM that is to be invoked. In addition, in one embodiment, the current state of the state machine in the interrupt controller 204 is readable and writable to allow the VMM to switch VMs. In another embodiment, the state machine in the interrupt controller 204 is readable and the VMM has to replay a series of writes to the interrupt controller 204 to place the interrupt controller 204 into the correct state.

The interrupt controller 204 may be a conventional interrupt controller (e.g., an 8259A interrupt controller) that is enhanced to provide a read and write access path to its registers and state machine. The read and write access path may be implemented, for example, as an extension to chipset specific registers to provide the behavior that is identical to the behavior of the conventional interrupt controller (e.g., the read-only registers remain read-only unless being accessed by the VMM). This can be achieved, for example, by providing access to the registers of the interrupt controller through memory mapped I/O registers. The interrupt controller 204 may include masking and prioritization logic that is known to one of ordinary skill in the art.

The interrupt controller 204 is coupled to the multiplex blocks 206. The number of multiplex blocks 206 is equal to the number of interrupt request lines 208. Each interrupt request line 208 propagates interrupt requests generated by a specific device to a corresponding multiplex block 206.

In a virtual machine system, a device may be managed by a certain VM and generate interrupts that need to be delivered to this VM. For example, a video capture card may be managed directly by a single VM and may not be visible to others VMs. Alternatively, a device may be managed by several VMs and generate interrupts that need to be delivered to multiple VMs. Yet, alternatively, the device may be managed by the VMM and generate interrupts that need to be delivered to the VMM. For example, an integrated drive electronics (IDE) controller may be managed exclusively by the VMM.

Each multiplex block 206 receives interrupt request signals generated by a specific device. Depending on its setting, each multiplex block 206 may route an interrupt request signal to the interrupt controller 204 or the VMM block 210. In one embodiment, the multiplex blocks 206 are set by the VMM. The VMM may set the multiplex blocks 206 prior to requesting a VM entry and/or following a VM exit. In another embodiment, the multiplex blocks 206 are set by the processor as part of a VM entry and/or a VM exit. The values used to set the multiplex blocks 206 may be stored in the VMCS or in any other data structure.

In one embodiment illustrated in FIG. 2, when a multiplex block 206 is set to route interrupt request signals generated by a corresponding device to the interrupt controller 204, the interrupt request signal may be routed to a specific input of the interrupt controller 204. For example, FIG. 2 shows interrupt IRQ0 being routed to input 1 of the interrupt controller 204 and IRQ1 is shown routed to input 0 of the interrupt controller 204. Other embodiments allow the interrupt request signal to be routed to a single fixed input of the interrupt controller 204.

In addition, in the embodiment illustrated in FIG. 2, when a multiplex block 206 is set to route interrupt request signals generated by a corresponding device to the VMM block 210, the interrupt request signal can be routed to a fixed input of the VMM block 210. For example, in the example shown in FIG. 2, IRQn is routed to the $n^{th}$ input of the VMM block 210. In another embodiment, the interrupt request signal may be routed by the multiplex block 206 to an arbitrary input of the VMM block 210.

The VMM block 210 includes a number of input lines connected to the output lines of the multiplex blocks 206. The VMM block 210 generates an output signal indicating to the processor 200 that control needs to be transitioned to the VMM. In one embodiment, the output signal is generated by combining the interrupt request signals routed to the VMM block 210 with an external signal generated by an external signal source 218. An external signal may be any signal, other than a signal of an external interrupt type, that may be configured by the VMM to cause a VM exist. For example, as shown in FIG. 2, an external signal may be a non-maskable interrupt (NMI) signal that is configured to cause a VM exit each time the NMI occurs. The interrupt request signals are combined with the external signal using a Boolean OR operator illustrated by a gate 216.

In one embodiment, the VMM block 210 includes a mask register 212 that can mask an interrupt request signal routed to the VMM block 210.

In one embodiment, the VMM configures the mask register 212 to allow masking of interrupt request signals generated by certain devices. Masking may be used when the VMM does not need to be notified about interrupts generated by a device managed exclusively by a non-currently operating VM. In one embodiment, the mask register 212 is set by the VMM. The VMM may set the mask register 212 prior to requesting a VM entry and/or following a VM exit. In another embodiment, the mask register 212 is set by the processor as part of a VM entry and/or a VM exit. The value used to set the mask register 212 may be stored in the VMCS or in any other data structure.

In one embodiment, the VMM block 210 includes a status register 214 that stores status of interrupt input lines of the VMM block 210. In one embodiment, when an interrupt request signal is asserted on an interrupt input line of the VMM block 210, a bit associated with this interrupt input line in the status register 214 is set. The status register 214 may be read by the VMM to obtain the status of the interrupt input lines of the VMM block 210. The status may be used, for example, to determine whether the output signal sent to the processor 220 by the VMM block 210 resulted from an interrupt propagated from an interrupt request line 208 or from an external signal (e.g., an NMI signal) generated by the external signal source 218.

As discussed above, in one embodiment, the VMM configures the multiplex blocks 206 prior to requesting a transfer of control to a VM. In this embodiment, once the control is transferred to a VM as requested by the VMM, only interrupt request signals generated by devices managed by the VM are allowed to reach the interrupt controller 204. Interrupts managed by the VMM are routed to the VMM block 210. Interrupts managed by other VMs are routed to the VMM block and may be masked using masking register 212. Thus, the chipset core logic 202 allows a currently-operating VM to control all the interrupts generated by the devices managed by the currently-operating VM, while allowing the VMM to gain control over interrupts generated by devices owned by the VMM and other VMs.

In some embodiments, the chipset core logic 202 may include multiple interrupt controllers 204, with each interrupt controller 204 serving a corresponding VM. In those embodiments, the VMM does not need to save and restore the state of the interrupt controller each time it switches from one VM to another.

As discussed above, in some embodiments, the multiplex blocks 206 and mask register 212 are configured as part of a VM entry (e.g., by the VMM before requesting a VM entry or by the processor when performing a VM entry). Hence, the settings of the multiplex blocks 206 and mask register 212 remain unchanged following a VM exit, and interrupts generated during the operation of the VMM are routed according to the settings of a previously-operating VM. That is, if interrupts are not masked by the VMM, they may be delivered to the VMM via the interrupt controller 204 or the VMM block 210 using the mechanisms discussed above. The designated software within the VMM then handles these interrupts appropriately.

In other embodiments, the multiplex blocks 206 and mask register 212 are configured as part of a VM exit (e.g., by the VMM following a VM exist or by the processor when performing a VM exit). Hence, the multiplex blocks 206 and mask register 212 may be changed to route interrupts generated during the operation of the VMM differently than during operation of the VM which was running previously.

Figure 3:
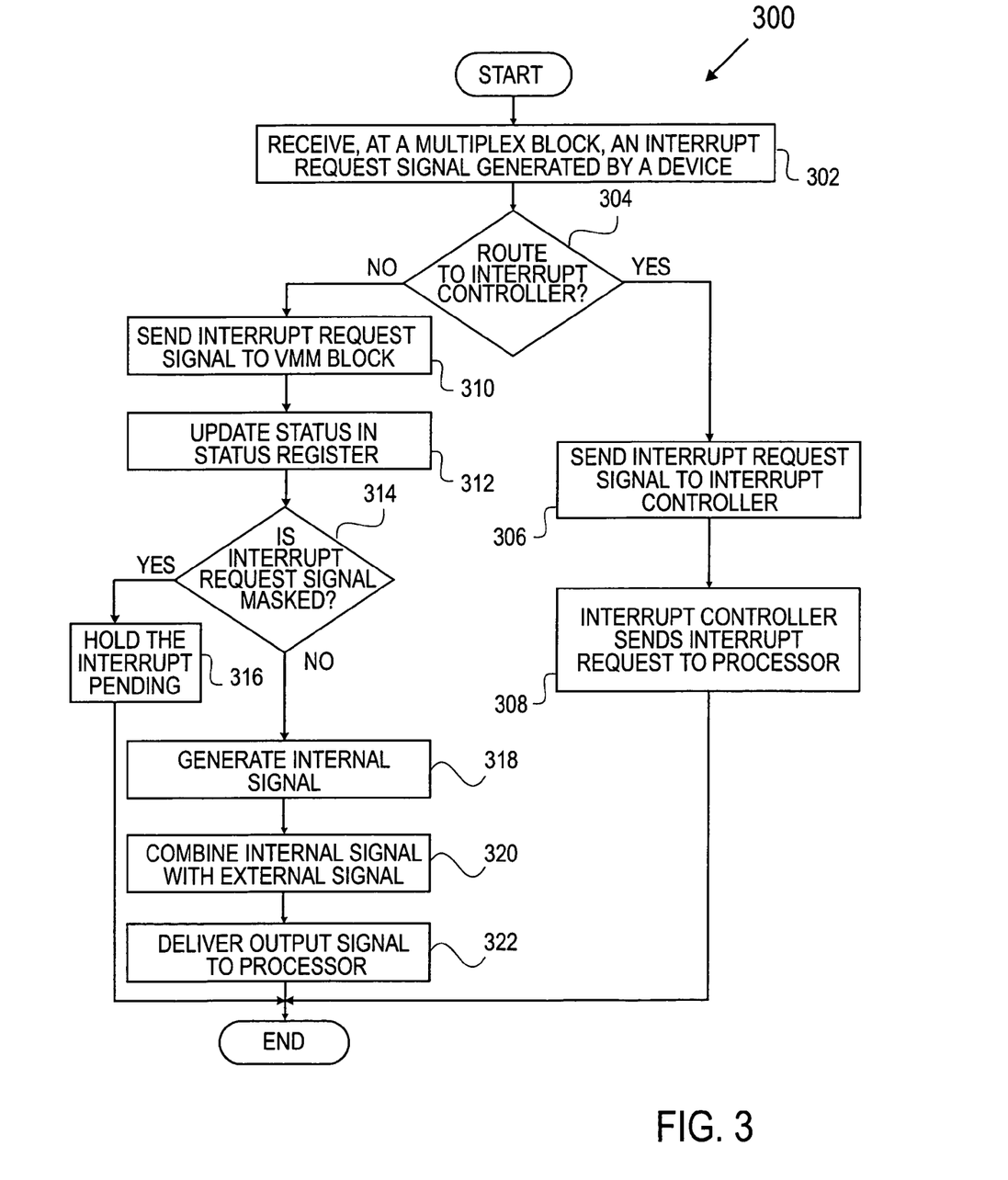
FIG. 3 is a flow diagram of one embodiment of a process for handling interrupts in a virtual machine system.

FIG. 3 is a flow diagram of one embodiment of a process 300 for handling interrupts in a virtual machine system. The process may be performed by processing logic that may comprise hardware(e.g., circuitry, dedicated logic, programmable logic, microcode, etc.), software (such as run on a general purpose computer system or a dedicated machine), or a combination of both. In one embodiment, processing logic is implemented in chipset core logic 202 of FIG. 2.

Referring to FIG. 3, process 300 begins with processing logic receiving, at a multiplex block, an interrupt request signal generated by a device (processing block 302). As discussed above, each multiplex block is coupled with a distinct interrupt requested line that delivers interrupt request signals generated by a certain device.

At decision box 304, processing logic determines whether the interrupt request signal is to be routed to the interrupt controller. In one embodiment, this determination is done based on the configuration performed by the VMM.

If the determination made at decision box 304 is positive, processing logic sends the interrupt request signal to the interrupt controller (processing block 306), which may, according to the architecture of the interrupt controller, send the interrupt request to the processor (processing block 308). The interrupt controller may perform masking and prioritization of interrupts.

If the determination made at decision box 304 is negative, processing logic routes the interrupt request signal to the VM block (processing block 310) and updates a status register of the VM block to indicate that a signal has been asserted on an interrupt input line of the VMM block (processing block 312). Next, processing logic determines whether the interrupt request signal routed to the VMM block is masked (decision box 314). In one embodiment, the determination is made based on the data set by the VMM in a mask register of the VMM block. If the interrupt request signal is masked, processing logic holds the interrupt pending (processing block 316). The interrupt may be held pending, for example, until a VM managing the device that generated this interrupt is invoked. At the time the VM managing the device is invoked, the VMM will modify the configuration of the multiplex blocks to route the interrupt request to the interrupt controller and hence allow the VM to manage the device directly.

If the interrupt request signal is not masked, processing logic generates an internal signal (processing block 318), combines the internal signal with an external signal generated by a designated external signal source (e.g., an NMI source) using the OR operator (processing block 320), and delivers the resulting output signal to the processor (processing block 322).

The output signal may cause the processor to transfer control to the VMM. The VMM may then read the status register of the VMM block, determine that the signal resulted from an external interrupt, and handle this external interrupt itself or invoke an appropriate VM to handle it. It should be noted that an external signal (e.g., NMI) causing the output signal may require some predicted operations to be performed by the processor when asserted. If these predefined operations are different from the desired behavior, then the processor blocks the output signal to avoid the occurrence of the predefined operations. For example, an NMI may cause a transition within the VMM (e.g., by vectoring the NMI) when it is asserted during operation of the VMM. Blocking the NMI signal following the VM exit caused by the assertion of the NMI prevents the occurrence of the predefined transition within the VMM.

Figure 4:
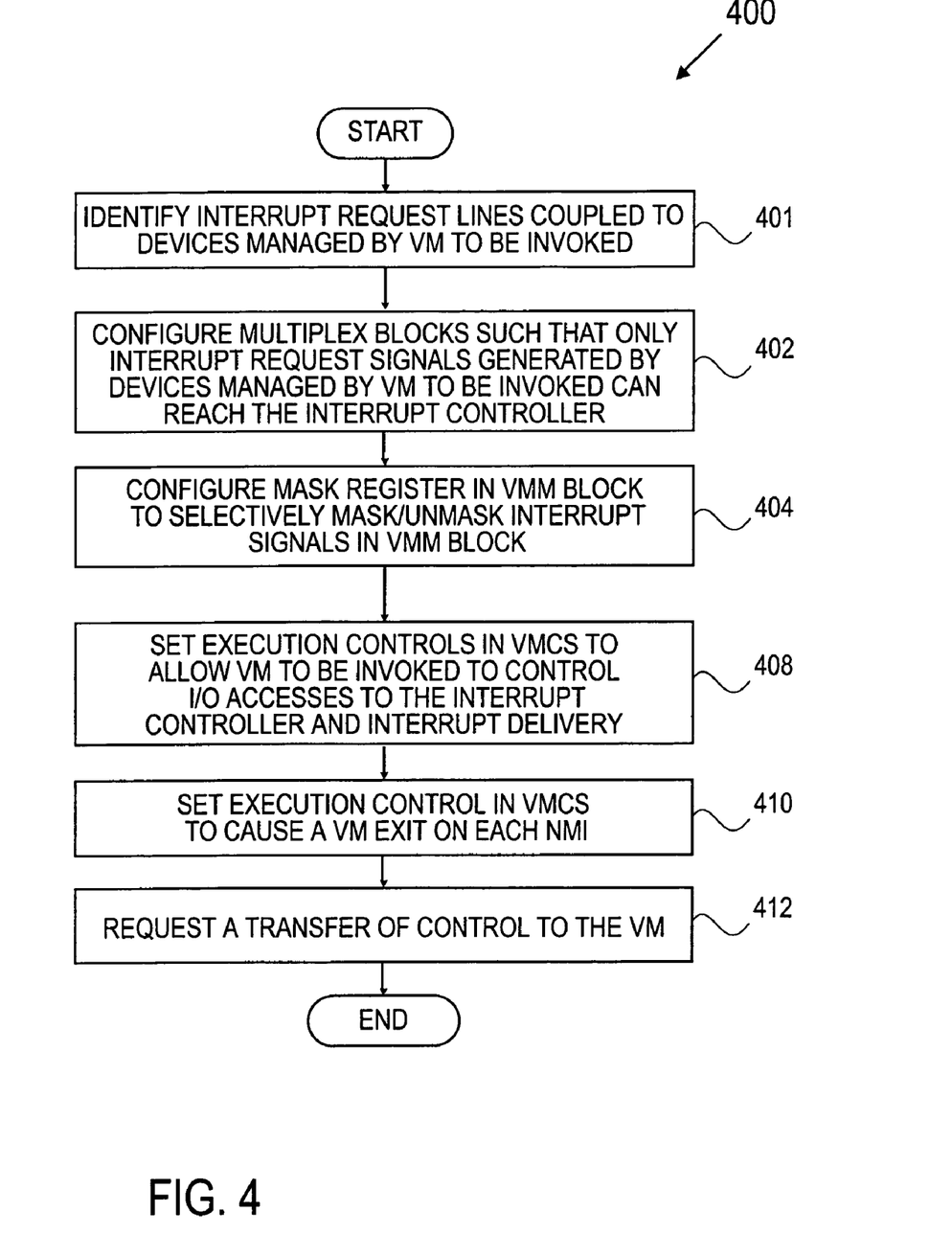
FIG. 4 is a flow diagram of one embodiment of a process for configuring the handling of interrupts during execution of a virtual machine in a virtual machine system.

FIG. 4 is a flow diagram of one embodiment of a process 400 for handling interrupts in a virtual machine system. The process may be performed by processing logic that may comprise hardware (e.g., circuitry, dedicated logic, programmable logic, microcode, etc.) software (such as run on a general purpose computer system or a dedicated machine), or a combination of both. In one embodiment, processing logic is implemented in a VMM such as the VMM 112 of FIG. 1.

Referring to FIG. 4, process 400 beings with processing logic identifying interrupt request lines that are coupled to devices managed by a VM to be invoked (processing block 401). In one embodiment, these interrupt request lines are identified using data stored in the VMCS or any other data structure.

Next, processing logic configures a set of multiplex blocks (processing block 402). Based on this configuration, only interrupt request signals from the devices managed by the VM to be invoked can reach the interrupt controller. All the remaining interrupt signals are to be routed to the VMM block. In addition, in another embodiment, the VMM may configure the multiplex blocks to route the interrupt to a particular input of the VMM block.

At processing block 404, processing logic configures a mask register in the VMM block to allow selective masking of interrupt request signal routed to the VMM block. The selective masking can be used, for example, to hold some interrupt requests pending. Interrupt requests may be held pending it, for example, the VMM does not need to be notified about these interrupt requests because they come from a device that is managed exclusively by another VM. However, some interrupts belonging to another VM may not be masked if, for example, the other VM needs to run at a higher priority than the currently running VM. An example of such a situation is a VM which maintains some real-time quality of service with respect to some device (e.g., all interrupts need to be serviced in a specific amount of time).

At processing block 408, processing logic sets designated execution control fields in the VMCS to allow the VM being invoked to control I/O accesses to the interrupt controller and delivery of hardware interrupts. For example, the VMM may set designated execution control fields in the VMBS such that accesses to the I/O ports of the interrupt controller do not cause VM exits.

At processing block 410, processing logic sets a designated execution control field in the VMCS to cause a VM exit on each event generated when the VMM block asserts its output signal to the CPU. In one embodiment, the event may be a non-maskable interrupt (NMI). Other embodiments may use other events, according to the architecture of the chipset core logic and system. The VMM May also need to set controls such that certain predefined operations following VM exits are prevented from happening. For example, if the output signal of the VMM block of FIG. 2 is coupled to the NMI input of the processor, then the NMI signal may need to be blocked following VM exits the result from the assertion of the NMI signal.

At processing block 412, processing logic executes a VM entry instruction to request a transfer of control to the VM. Any mechanism in the art may be used to facilitate this transfer of control of the VM. After the transfer of control to the VM, the VM can directly access the interrupt controller (e.g., using I/O operations) and interrupts routed through the interrupt controller will be handled directly by the VM, with no intervention by the VMM.

Figure 5:
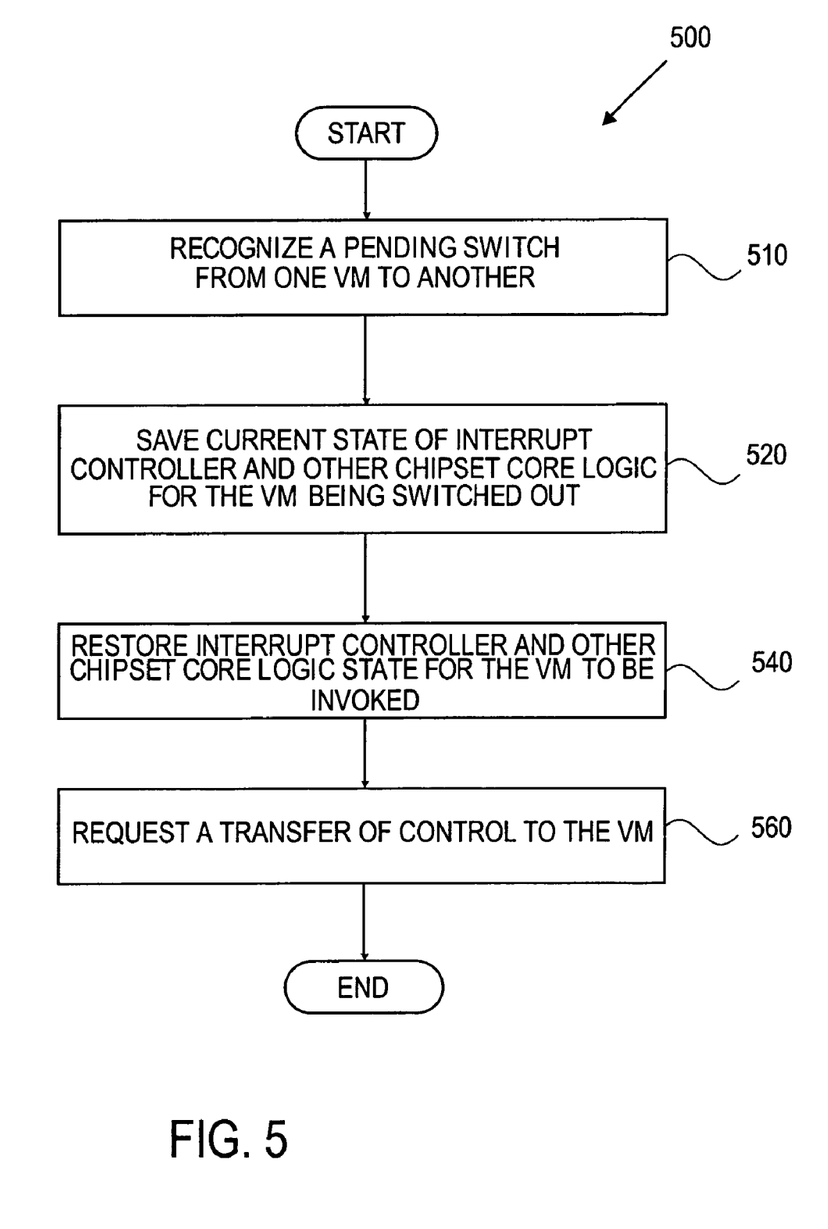
FIG. 5 is a flow diagram of one embodiment of a process for managing the configuration of the chipset interrupt control during a switch in virtual machines in a virtual machine system.

FIG. 5 is a flow diagram of one embodiment of a process 500 for managing chipset core logic state during a switch from one VM to another VM. The process may be performed by processing logic that may comprise hardware (e.g., circuitry, dedicated logic, programmable logic, microcode, etc.), software (such as run on a general purpose computer system or a dedicated machine), or a combination of both. In one embodiment, processing logic is implemented in a VMM such as the VMM 112 of FIG. 1.

Referring to FIG. 5, process 500 begins with processing logic recognizing that a transfer of control from one VM to another VM is pending (processing block 510). This may occur, for example, if the VMM is managing more than one VM, providing time slices to each VM in turn, similarly to how a traditional operating system may time slice processes on a single CPU.

At processing block 520, processing logic saves the current state of the interrupt controller. The state may be saved in the VMCS or any other designated data structure. In an embodiment, this saving of state is performed by the VMM. In another embodiment, the saving of the interrupt controller of the interrupt controller state is performed as part of the processing at the time of a VM exit. Additionally, processing logic may need to save the state of the multiplex controls, and the VMM block masking register. The saving of state relies on having the ability to read all appropriate state in the chipset core logic, as described above.

At processing block 540, processing logic restores the chipset core logic state form the previous operation of the VM to be activated. This restoration includes writing all appropriate state to the interrupt controller to configure the masking and control registers and state machine configuration that was present when the VM to be activated was last active. Additionally, the multiplex blocks and VMM block controls (e.g., masking register) in the chipset core logic may need to be reconfigured for the new VM, as described above. This restoration of state relies on having the ability to write all appropriate state in the chipset core logic. In one embodiment, this restoration of chipset core logic state is performed by the VMM. In another embodiment, it is performed by the processor as part of the VM entry to the new VM.

At processing block 560, the VMM requests a transfer of control to the VM. In one embodiment, the VMM executes an instruction to initiate the transfer. Any mechanism in the art may be used to facilitate this transfer of control to the VM.

It should be noted that process 500 assumes that the execution controls were set appropriately prior to the first entry to the new VM (as described with regard to process 400).

Thus, a method and apparatus for handling interrupts in a virtual machine system have been described. It is to be understood that the above descriptions is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
   an interrupt controller;
   one or more interrupt request lines;
   one or more multiplex blocks couplable with the interrupt controller and the one or more interrupt request lines, each of the one or more multiplex blocks corresponding to a distinct one of the one or more interrupt request lines; and
   a virtual machine monitor (VMM) block couplable to the one or more multiplex blocks and a processor;
   wherein each of the one or more multiplex blocks is to route an interrupt request signal received via a corresponding interrupt request line either to the interrupt controller or the VMM block depending on a current configuration value of said each of the one or more multiplex blocks.

2. The system of claim 1 wherein the current configuration value of said each of the one or more multiplex blocks requires that the interrupt request signal be routed to the interrupt controller if a device generating the interrupt request signal is managed by a currently operating virtual machine (VM).

3. The system of claim 1 wherein the current configuration value of said each of the one or more multiplex blocks requires that the interrupt request signal be routed to the VMM block if a device generating the interrupt request signal is not managed by a currently operating virtual machine (VM).

4. The system of claim 1 wherein the VMM block comprises a mask register to store mask information pertaining to one or more interrupt request signals routed to the VMM block.

5. The system of claim 4 wherein the VMM block is to assert an internal signal if one of the one or more routed interrupt request signals is asserted and is not masked, and to send the internal signal to the processor to cause a transition of control to a VMM.

6. The system of claim 5 wherein the VMM block is further to combine the internal signal with an external signal generated by an external signal source prior to sending the internal signal to the processor.

7. The system of claim 6 wherein:
   the external signal is a non-maskable interrupt (NMI) signal; and
   the external signal source is a NMI source.

8. The system of claim 6, wherein the internal signal is combined with the external signal using an OR operator.

9. The system of claim 4 wherein the mask register of the VMM block is configurable by a VMM.

10. The system of claim 1 wherein the VMM block comprises a status register to store status of each interrupt request signal routed to the VMM block.

11. The system of claim 1 wherein the interrupt controller has a read and write access path to a plurality of registers of the interface controller.

12. The system of claim 1 wherein:
    the one or more multiplex blocks are configured by a VMM.

13. An apparatus comprising:
    one or more multiplex blocks couplable with an interrupt controller and one or more interrupt request lines, each of the one or more multiplex blocks corresponding to a distinct one of the one or more interrupt request lines; and
    a virtual machine monitor (VMM) block couplable to the one or more multiplex blocks,
    wherein each of the one or more multiplex blocks is to route an interrupt request signal received via a corresponding interrupt request line either to the interrupt controller or the VMM block depending on a current configuration value of said each of the one or more multiplex blocks.

14. The apparatus of claim 13 wherein the current configuration value of said each of the one or more multiplex blocks requires that the interrupt request signal be routed to the interrupt controller if a device generating the interrupt request signal is managed by a currently operating virtual machine (VM).

15. The apparatus of claim 13 wherein the current configuration value of said each of the one or more multiplex blocks requires that the interrupt request signal be routed to the VMM block if a device generating the interrupt request signal is not managed b a currently operating virtual machine (VM).

16. A system comprising:
    a processor; and
    a memory, coupled to the processor, to store instructions, which when executed by the processor, cause the processor to identify one or more interrupt request lines that are coupled to one or more devices managed by a virtual machine (VM), configure one or more multiplex blocks to route interrupt request signals that are managed by the VM on the one or more interrupt request lines to an interrupt controller, configure one or more multiplex blocks to route interrupt request signals that are not managed by the VM to a virtual machine monitor (VMM) block, and generate a request to transfer control to the VM.

17. The system of claim 16 wherein the instructions, when executed by the processor, cause the processor further to configure a mask register in the VMM block to cause masking of interrupt requested signals routed to the VMM block.

18. The system of claim 16 wherein the instructions, when executed by the processor, cause the processor further to restore a state saved during a previous operation of the VM in the interrupt controller.

* * * * *